(12) United States Patent  (10) Patent No.: US 7,513,674 B1
Donahue  (45) Date of Patent: Apr. 7, 2009

(54) SEE-THROUGH ONE-WAY LIGHT-EMITTING LIGHT GUIDE

(76) Inventor: Kevin Gerard Donahue, 44 Brown Rd., Harvard, MA (US) 01451

( * ) Notice: Subject to any disclaimer, the term of this patent is extended or adjusted under 35 U.S.C. 154(b) by 0 days.

(21) Appl. No.: 11/336,263

(22) Filed: Jan. 20, 2006

(51) Int. Cl.
*F21V 8/00* (2006.01)

(52) U.S. Cl. .................. 362/627; 362/606; 362/607; 362/618; 362/624; 362/103; 362/30

(58) Field of Classification Search ............... None
See application file for complete search history.

(56) References Cited

U.S. PATENT DOCUMENTS

| | | | | |
|---|---|---|---|---|
| 4,673,609 | A | * | 6/1987 | Hill ............................ 428/187 |
| 5,525,177 | A | | 6/1996 | Ross |
| 5,657,563 | A | | 8/1997 | Lane |
| 5,892,600 | A | * | 4/1999 | Kuo ............................ 359/15 |
| 5,925,437 | A | * | 7/1999 | Nelson ........................ 428/137 |
| 6,258,429 | B1 | * | 7/2001 | Nelson ........................ 428/42.1 |
| 6,640,029 | B1 | | 10/2003 | Prejzek |
| 6,745,506 | B2 | | 6/2004 | Maas |
| 6,752,432 | B1 | | 6/2004 | Richardson |
| 6,857,739 | B1 | | 2/2005 | Watson |
| 6,863,416 | B2 | * | 3/2005 | Waters ........................ 362/105 |
| 6,872,435 | B2 | | 3/2005 | Bull |
| 2005/0123707 | A1 | | 6/2005 | Veck |
| 2006/0105149 | A1 | | 5/2006 | Donahue |

* cited by examiner

*Primary Examiner*—Laura Tso
(74) *Attorney, Agent, or Firm*—The Johnson IP Law Firm; Rodney D. Johnson, Esq.

(57) ABSTRACT

A display system combines the principles of total internal reflection and halftone reflection. The display system includes a light guide, a light-reflecting see-through image disposed on the surface of the light guide, and a light-blocking see-through layer disposed over the image. A person viewing the light-blocking layer at a certain distance can see through the light guide without seeing the image. The display system can include a pair of eyeglasses that can provide self-illumination for night reading or serve as a hands-free flashlight. Also, novelty glasses can emit different colored lights as well as colored, lighted images. The display system can also include one-way see-through windows that emit lighted text and images for signage and advertising.

17 Claims, 6 Drawing Sheets

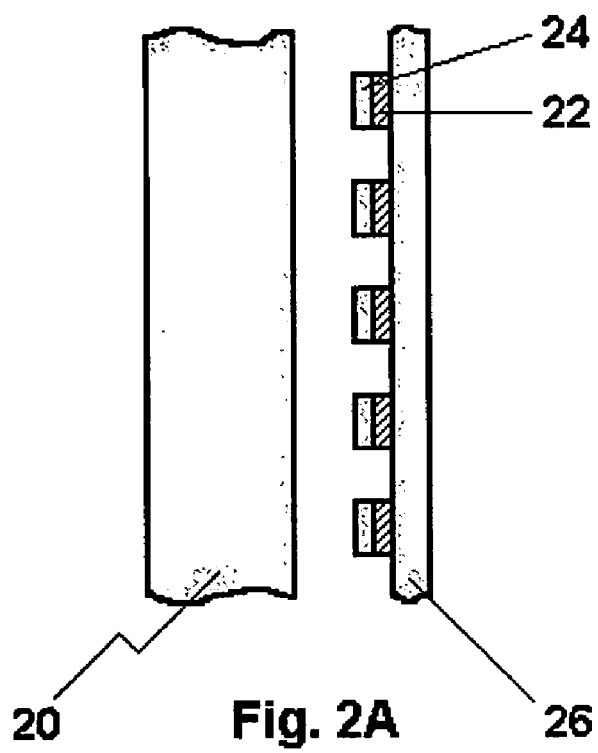
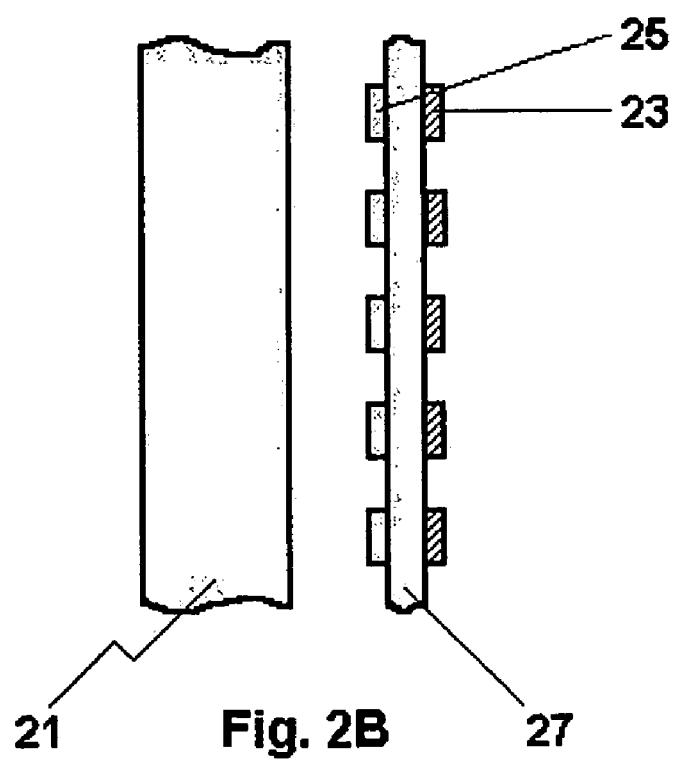

SEE-THROUGH ONE-WAY LIGHT-EMITTING LIGHT GUIDE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Copyright 2006, Donahue Labs, Inc.

CROSS REFERENCE TO RELATED APPLICATIONS

U.S. patent application Ser. No. 10/988,714 titled "Pressure-Sensitive Light-Extracting Paper" filed on Nov. 15, 2004.

BACKGROUND OF THE INVENTION

1. Field of the Invention

The present invention relates to light guides that emit light. More specifically, the invention relates to see-through one-way light-emitting light guides and embodiments in eyeglasses and windows.

2. Description of Prior Art

Wearers of eyeglasses often need additional illumination when reading in a dimly lit environment. There are many patents that describe different means of providing such illumination through various attachments to eyeglasses or to a cap or band worn on the head. Some of these devices can also serve as a hands-free flashlights.

There are advertising glasses that allow a cover containing an image to be placed over the eyeglass lenses. There are also novelty glasses containing specially coated lenses that display a hologram. Other novelty glasses contain different colored lights on the frame, or flashing lights.

There are also many illuminated panels for use in signage and advertising. Some of these utilize perforated window coverings and decals to make the image a one-way see-through image.

U.S. Pat. No. 4,254,451 issued to Cochran on Mar. 3, 1981 and titled "Flashing spectacles" discloses, in the Abstract: "An electronic circuit comprised of several integrated circuits sequentially actuates a plurality of light-emitting diodes (LED's) located in an article such as eyeglass frames, which are carried or worn by a person. In one embodiment, an oscillator driven binary up-down counter drives first and second binary to one-of-four decoders. The LED's are arranged in an electrical circuit which allows them to be addressed in X-Y matrix fashion. The first decoder sequentially addresses each "row" of LED's while the second decoder sequentially addresses each "column" of LED's in the matrix so that each LED in the matrix circuit is sequentially flashed. After the entire array of LED's has been sequentially actuated a predetermined number of times, the up-down counter is electronically switched to the opposite state so as to reverse the order in which the LED's are sequentially actuated. In a second embodiment, an integrated circuit binary ripple counter/oscillator drives first and second demultiplexers. The first demultiplexer sequentially actuates the rows of LED's in an X-Y matrix LED circuit, while the second demultiplexer sequentially actuates the columns in the matrix. The demultiplexers may be driven by the ripple counter/oscillator in a manner which allows a less than 100 percent duty cycle, thereby minimizing the drain on the battery power supply. The integrated circuits used are preferably of the complementary metal oxide semiconductor (CMOS) type for minimizing battery drain. When the invention is incorporated in eyeglass frames, the LED circuit is automatically switched on when the temple pieces of the frames are unfolded for wearing, and automatically switched off when the temple pieces are folded for storage." This patent describes a pair of spectacles which contains flashing LEDs on the frames around the lenses. The lenses of these spectacles, however, do not emit any light.

U.S. Pat. No. 4,283,127 issued to Rosenwinkel on Aug. 11, 1981 and titled "Novelty eyeglasses" discloses, in the Abstract: "A pair of novelty eyeglasses includes a frame for supporting them on the wearer's head and a pair of transparent lenses. The frame includes a pair of support earpieces connected by hinges to the frames. Two light emitting diodes or LEDs are secured to the frame, one adjacent each lense and connected to a portable source of power, such as small batteries, mounted in one of the earpieces. A hinge switch, defined at one of the hinges connecting one of the earpieces to the frame, must be closed by moving the respective earpiece to the open position before the LEDs can be actuated. A manually actuatable switch is secured to the frame in series with the batteries and the light emitting diodes. The manually actuatable switch can be selectively closed by the user to energize the LEDs thereby creating a novel effect." This patent describes a pair of novelty glasses having an LED secured to the frame of each lens. The lenses of the glasses, however, do not emit any light.

U.S. Pat. No. 4,358,488 issued to Dunklin et al on Nov. 9, 1982 and titled "Simulated vehicle louvre applique" discloses, in the Abstract: "A low cost sun screen device for use on motor vehicles is disclosed comprising a perforated polymer laminate sheet which is affixed to the interior surface of the vehicle rear window. The outermost surface of the laminate sheet includes artwork and other indicia formed thereon which when viewed by an observer through the rear window of the vehicle, simulates the appearance of a three-dimensional mechanical window louvre structure. The perforated laminate sheet provides an aesthetically pleasing, effective sunshield which reduces the temperature of the interior compartment of the vehicle by as much as forty percent while insuring that occupant visibility is not adversely affected." This patent describes the construction of a perforated laminate for use on automobile windows containing artwork that simulates a mechanical window louvre structure. The laminate, however, is not illuminated through light extracted from a light guide.

French Patent 2585479 issued to Koubi on 1-30, 1987 and titled "Illuminating spectacle-frame device" discloses, in the Abstract: "Device illuminating the field of vision of the wearer and protecting his eyes. The invention presented here relates to plastic spectacle frames fitted with a clamping system 27 which can receive lenses 6 for the protection or the correction of the sight of the wearer and with two mini-headlights 2 located at the ends of the frame and connected to an electrical cable 1 embedded in the bulk as well as in one of the sides 3 and emerging at the end of the side as a flexible wire with two connections 4, the wire being insulated in accordance with the standard and being terminated by a male connector 5 which can be connected to the power-supply case 26. This case 26 includes a cover 22 equipped with an on/off push button 24 for establishing the electrical connection between the battery and the mini-headlights. The frame is held in place by attaching, at the ends of the sides, two curved plastic pieces 14 which match the back of the head (a device which is easily removed). The device, according to the invention, is particularly intended for all work requiring a constant illumination over the work area with or without protection of the eyes (professional and leisure use)." This patent describes a device attachable to a spectacle frame containing two mini-headlights near the left and right hinge of the spectacle to provide illumination for reading. The lenses of these spectacles, however, do not emit any light.

U.S. Pat. No. 4,673,609 issued to Hill on Jun. 15, 1987 and titled "Unidirectional panel" discloses, in the Abstract: "A panel which comprises a substrate of transparent or translucent material having applied to one or both sides a design superimposed on, or forming part of, an opaque pattern so that the design on one side of the panel cannot be seen from the other side." This patent describes the construction of a one-way see-through panel where an image can be observed or made transparent by using contrasting illumination from one side to the other. The image, however, is not illuminated through light extracted from a light guide.

U.S. Pat. No. 4,822,160 issued to Tsai on Apr. 18, 1989 and titled "Flashing spectacles" discloses, in the Abstract: "This invention relates to a pair of flashing spectacles and in particular to one including a pair of spectacles, and an electrical device which has an external resistor for controlling frequency of the square waves generated by the oscillator, an on/off latch having an input connected with one and of a reset switch and an output connected with the oscillator and a counter, a decoder controller connected to output of the counter, an open drain driver connected with the decoder controller, a plurality of light emitting diodes connected with output of the open drain driver and a battery connected between output of the light emitting diodes and the other end of the reset switch whereby the light emitting diodes will emit light in turn when the reset switch is pressed once but will extinguish when the reset switch is further pressed." This patent describes novelty spectacles which contain a series of flashing LEDs on the upper part of the spectacles. The lenses of these spectacles, however, do not emit any light.

U.S. Pat. No. 4,822,161 issued to Jimmy on Apr. 18, 1989 and titled "Illuminating spectacle apparatus" discloses, in the Abstract: "An illuminating spectacle apparatus is set forth wherein a generally "U" shaped framework is provided with a forward centrally positioned "U" shaped inner and outer lens. Between the respective inner and outer lens are positioned a series of lights constructed and arranged for sequential flashing by a remote power supply and control box arrangement." This patent describes novelty spectacles consisting of a "U" shaped frame with a series of lenses and lights that blink sequentially. The lenses of these spectacles, however, do not emit any light.

U.S. Pat. No. 4,940,622 issued to Leavitt on Jul. 10, 1990 and titled "Printed film sheet" discloses, in the Abstract: "A method for applying informational images, such as advertising, to surfaces, particularly the windows of commercial vehicles. The method comprises applying a UV resistant emulsion to a laminate substrate of perforated metalized polymeric vinyl. The coated substrate is silk-screened with the appropriate image and is secured to the interior of the vehicle window by a peripheral tape strip and by spray adhesive." This patent describes the construction of a perforated substrate that is subsequently screen printed with an image. The printed film sheet, however, is not illuminated through light extracted from a light guide.

U.S. Pat. No. 4,959,760 issued to Wu on Sep. 25, 1990 and titled "Lighting equipment for an eyeglasses" discloses, in the Abstract: "A lighting equipment for an eyeglasses includes a fin attached to one side of a main frame of the eyeglasses. A clamping frame has a pair of retaining plates formed at one side and a pair of clamping plates formed at an other side. The fin is force-fitted within the retaining plates of the clamping frame. A housing has an open lateral end enclosable by the clamping frame. A bulb is force-fitted and laterally rotatable within the housing. The light beam emitted from the bulb is adjustable both in a vertical direction and in a lateral direction." This patent describes a lighting device that is attachable to eyeglasses and can adjust the direction of the emitted light. The lenses of the eyeglasses, however, do not emit any light.

British Patent 2,244,585 issued to Akers on Dec. 2, 1991 and titled "Transparent material with perforations" discloses, in the Abstract: "A transparent material C for use in advertising, supports one or more printed layers D and E, and is attached to a substrate A which may be a window or other transparent material. To improve the visibility of the printed layers, the material C is provided with a plurality of perforations F. These perforations may be of circular, square or other shape, and the perforations may be effected before or after the addition of printed layers. The material C and printed layers, may be attached to the substrate A by means of a self-cling layer B. Material C may be a vinyl polymer." This patent describes the construction of a perforated transparent material for use in advertising. The transparent material, however, is not illuminated through light extracted from a light guide.

U.S. Pat. No. 5,114,218 issued to Black on May 19, 1992 and titled "Liquid crystal sunglasses with selectively color adjustable lenses" discloses, in the Abstract: "LC sunglasses with selectively color adjustable lenses comprising an energy cell (30) attached to one butt-strap (22) of a rim (10), a color changing switch (28) supported by another butt-strap (24), a memory chip (26) supported by a bridge portion (16) of the glasses rim, and lenses (12 and 14) of a laminated structure. Each lens consists of a color mosaic mask (43), an input polarizing plate (44), a liquid crystal cell (50) sandwiched between voltage-controlled active matrices (52a and 52b), and an output polarizing plate (46). When the wearer of the sunglasses wants to change the color of the lenses (12 and 14), he/she installs the switch (28) into the position of a selected color, whereby the battery cell (30) is electrically connected with respective pixel sets of the active matrices (52a and 52b) via the memory chip (26). As a result, the lenses will pass only the component of the white light (W) which corresponds to the selected color." This patent describes sunglasses that can be made to change colors by the wearer. The sunglass lenses, however, do not emit a lighted graphic image.

U.S. Pat. No. 5,202,180 issued to Watts on Apr. 13, 1993 and titled "Printed film sheet" discloses, in the Abstract: "A flexible decorative web that can be laminated to a substrate and that exhibits serial changes in its appearance with changes in viewing angle relative to incident white light. Chromatic, iridescent and metallic pigments produce three separate appearance zones where the chromatic pigment is most predominant, where the iridescent pigment is most predominant and where a transition occurs and neither the chromatic pigment nor the iridescent pigment predominates. The metallic pigment accentuates the iridescent appearance or flash by its sparkle effect produced both in the iridescent appearance areas and in the transition areas immediately surrounding and highlighting the iridescent appearance areas." This patent describes the construction of a decorative film that exhibits changes in its appearance when viewed or illuminated from different angles. The film, however, is not illuminated through light extracted from a light guide.

U.S. Pat. No. 5,217,791 issued to Fujita et al on Jun. 8, 1993 and titled "Printed film sheet" discloses, in the Abstract: "A printed film sheet in which an image printed on a transparent film sheet can be seen from both the printed side and the non-printed side of said film sheet. The transparent film sheet is provided with a coating composition containing one or more pigments and one or more adhesives so that said film sheet has a brightness of above 50%. The pigments include one or more pigments having a linseed oil absorption of 10 to 80 ml/100 g in an amount of 70 to 100% by weight of the total pigment content. The film sheet has an opacity of 20 to 60% and is printed so that the difference between the ink density of a printed image on the printed side of said film sheet and the ink density thereof on the non-printed side of said film sheet is below 35%." This patent describes a method to print an image on a transparent film such that the image is clearly recognizable from the printed side and the reverse side. The image, however, is not illuminated through light extracted from a light guide.

U.S. Pat. No. 5,218,385 issued o Lii on Jun. 8, 1993 and titled "Flash light eyeglasses with hinge switch" discloses, in the Abstract: "A pair of flash eyeglasses has a switch positioned in a space between two screw projections at one end of a frame fitted with a flash light board therein. A skull temple has an ear at one end to be combined between the two projections in the frame with a screw so that the skull temple can swing open or closes with the screw as a pivot. A switch is placed in the space between the two projections in the frame to be pressed or released to turn on or off a circuit of the flash light board by the ear in the skull temple when the skull temple is swung open or closed." This patent describes eyeglasses with a hinge that turns on a flash light switch when the two temple arms are open, and turns off the flash light switch when the two temple arms are closed. The lenses of these eyeglasses, however, do not emit any light.

U.S. Pat. No. 5,258,214 issued to Cooledge et al on Nov. 2, 1993 and titled "Preprinted thin plastic film wall covering, and method for making the same" discloses, in the Abstract: "Thin filmed thermoplastic material wall coverings having a preprinted image thereon and provided with a static electrical charge for securing the coverings to a surface. The wall covering may comprise posters, maps, and the like, and the image is printed on the film by means such as silk-screening. The static electrical charge is sufficient to removably secure the film to a wall surface, a window, or the like, and allows for relocation of the covering without damage to the surface upon which it is secured. The coverings may be packaged individually, or be dispensed from a continuous roll. Preprinted maps adherable to a window surface such as a windshield of an automobile are provided." This patent describes the construction of wall and window coverings using static cling film pre-printed with an image. The image, however, is not illuminated through light extracted from a light guide.

U.S. Pat. No. 5,273,796 issued to Elbing et al on Dec. 28, 1993 and titled "Paper translites" discloses, in the Abstract: "This invention relates to paper translites comprising a translucent paper sheet or web bearing on the front facing thereof an image area of a right reading in one or more colors, and on the back facing thereof an image area but of a reverse image and of the same colors. Each of the image areas is printed by halftone dots, and the image area of the reverse image has substantially dot-for-dot registration with the image area of the right reading. The printing plate used for printing the image area for the reverse image has about the same or a lower percentage of halftone dots than the printing plate used for printing the image area for the right reading, thereby resulting in a lighter value for each color of the reverse image relative to the same color of the right reading. The resulting translite is equally pleasing viewed by reflective light only and viewed by transmitted light." This patent describes the construction of printed halftone images that can be viewed with reflective or transmitted light. The images, however, are not illuminated through light extracted from a light guide.

U.S. Pat. No. 5,346,433 issued to Weinreich on Sep. 11, 1994 and titled "Mirror illusion" discloses, in the Abstract: "By a new configuration which more efficiently controls illumination, it is possible to make a mirror dissolve illusion which uses less power than those previously known in the art. A reflector and lamp assembly is provided in front of a partially reflective and partially transparent (one-way) mirror to direct light to a viewer via the one-way mirror. The technique includes use of a backlit wall pattern and a reflective floor surface along with a mirror of reduced density." This patent describes the use of a one-way mirror and variable illumination to make an object appear and disappear to a viewer. Illumination is not created through light extracted from a light guide.

U.S. Pat. No. 5,376,977 issued to Liu on Dec. 27, 1994 and titled "Glasses structure for advertising" discloses, in the Abstract: "The present invention relates to a kind of glasses structure for advertising mainly comprising a movable cover plate, a pair of glasses and a hook mounting. The movable cover is inserted to the front frame of the glasses at the two convex pieces found on each side by means of a convex axis designed at both sides of the upper section of the glasses. The hook mounting is specially designed such that the pair of glasses can be kept at the waist to a belt and the movable cover plate can thereon be used as a very convenient means of publicity." This patent describes a cover plate fitted over a pair of glasses as an advertising item. There is no illumination.

U.S. Pat. No. 5,432,623 issued to Egan on Jul. 11, 1995 and titled "Optical lens incorporating an integral hologram" discloses, in the Abstract: "A lens design consisting of a multi-component assembly, with one of the said components being a (decorative) hologram. The said assembly being comprised of an optical-quality holographic recording material coating applied to the inner or outer surface of a primary lens element, upon which a hologram may then be recorded in-situ, and may be used alone, or be optically contacted to a secondary lens element to form a unitary assembly of high optical quality and clarity, with the holographic recording material being encapsulated between the primary and secondary elements. The said lens assembly may be of simple or compound curvature, and be used in functional, prescription-quality eyewear of single or multi-lens type. Also, one or more of the lens components, other than the hologram, may function in a light-filtering role, so as to visually eliminate unwanted images or colors to the wearer, and further allow such lens assemblies to be used in sunglasses. In addition, the said lens assembly may contain multiple images on the holographic recording material, which are visible to an observer during different periods of daytime sunlight, or under various artificial lighting conditions." This patent describes the construction of an optical quality lens which incorporate a hologram as an integral portion of the lens. The lens, however, does not emit any light.

U.S. Pat. No. 5,485,358 issued to Chien on Jan. 16, 1996 and titled "Universal L.E.D. safety light for head-wear" discloses, in the Abstract: "A lighting arrangement for head-wear is made up of several light emitting diodes mounted on a flexible plate. The flexible plate is one of the straps of the length-adjustable belt conventional provided at the rear of a cap. The strap on which the LED is mounted may be stitched to the rear of the cap in conventional fashion and used for length adjustment purposes or may alternatively by stitched to the side of the cap to be used solely as a mounting for the lighting arrangement." This patent describes a flexible plate of LEDs that can be mounted onto head-wear to create a novelty head-wear. This flexible plate, however, does not involve eyeglasses that emit light.

U.S. Pat. No. 5,525,177 issued to Ross on Jun. 11, 1996 and titled "Image transfer method for one way vision display panel" discloses, in the Abstract: "A method of producing an image onto a surface of a one-way vision display panel of the type which is constructed as a perforated membrane having an opaque light-reflective surface and a light-absorbing surface and whereby the image is clearly visible when viewing the display panel from one direction and wherein the perforated membrane permits substantially unobstructed through-viewing when viewing the display panel from a second, opposite direction. The method substantially eliminates the corona effect of the image while viewing the display panel in the through-viewing direction, the corona effect being the result of stray ink which has traveled from the image layer into the through-holes of the perforated membrane during the image printing process. The method includes the steps of: electrostatically transferring ink onto a transfer medium as a reverse image for temporarily holding the reverse image for later transfer to a surface of a perforated membrane; and transferring the reverse image from the transfer medium using heat and/or pressure in order to form a desired correctly oriented image onto only the solid bar portions of a surface of a perforated membrane without any substantial image transfer into or through the through-holes of the perforated membrane such that the correctly oriented image is substantially undetectable when looking at the one-way vision display panel in the second, opposite through-viewing direction." This patent describes a method of printing an image onto a one-way perforated display panel. The display panel, however, is not illuminated through light extracted from a light guide.

U.S. Pat. No. 5,594,573 issued to August on Jan. 14, 1997 and titled "Image display glasses having an LCD for displaying an image wherein the image provides for viewing by others" discloses, in the Abstract: "Glasses include lens assemblies held by a frame to be worn by a user. The lens assemblies have liquid crystal displays which are operatively connected to a PC board mounted on the frame. The printed circuit board drives the liquid crystal display to produce animated images which may be seen by one facing the wearer. A battery mounted on the frame powers the chip and PC board." This patent describes a method to produce glasses having animated images displayed on the lenses. A liquid crystal display (LCD) connected to a PC board is used to create the images on the lenses. Illumination is not derived from light extracted from a light guide.

Japanese Patent 9017204 issued to Isobe on Jan. 17, 1997 and titled "Glasses mounted luminaire" discloses, in the Abstract: "PURPOSE: To accurately read out fine letters and numerals even in a dark place. CONSTITUTION: A set of lighting systems are mounted on the part of the bow 5 of a glasses. Since they are mounted direct to a glasses, small-size, lightweight and fine view are required. An LED lamp having high reliability is used for an illumination lamp. A horizontal off-switch 7 is actuated during conversation to put out lights so as to prevent illumination light from entering the eye of a companion to talk with." This patent describes an LED assembly mounted on the temple arm of glasses to illuminate the area in front of the glasses. The lenses of the glasses, however, do not emit any light.

U.S. Pat. No. 5,598,231 issued to Lin on Jan. 28, 1997 and titled "Glasses capable of producing a three-D visual effect" discloses, in the Abstract: "It is a pair of glasses capable of producing a 3-D visual effect, mainly including a frame, two polarizing lenses set in the frame, and two additional laminated lenses removably disposed either in front of or behind the two polarizing lenses. The laminated lenses each consists of two glass sheet layers, an LCD layer between the two glass sheet layers, and a polarizer layer attached to an outer side of one of the two glass sheet layers. When a voltage is applied to the LCD layer, molecules constituting the LCD layer rotate and change their arrangement directions to produce light blocking effect, enabling the glasses to be used as an LCD shutter glass for watching a 3-D image system. When the additional laminated lenses are removed, the glasses can be used as a normal sun glass." This patent describes the construction of glasses for producing 3-D effects using an LCD layer. Illumination is not created through light extracted from a light guide.

U.S. Pat. No. 5,657,563 issued to Lane on Aug. 19, 1997 and titled "Picture illumination display device" discloses, in the Abstract: "A picture illumination display device (10) comprising a picture frame (12). A one-way mirror (14) is in the picture frame (12), so that when a person normally looks into the one-way mirror (14) a reflection will be seen. A picture (16) is carried in the picture frame (12) behind the one-way mirror (14). A facility (18) behind the picture (16), is for producing light. Once the light producing facility (18) is activated an image of the picture (16) will be projected through the one-way mirror (14), to allow a person looking into the one-way mirror (14) to see the projected image from the picture (16)." This patent describes a picture display device that utilizes a one-way mirror together with a light source behind the picture in order to project the image from the picture. Illumination is not created through light extracted from a light guide.

U.S. Pat. No. 5,679,435 issued to Andriash on Oct. 21, 1997 and titled "Vision control panels with perforations and method of making" discloses, in the Abstract: "A retro-reflective vision control panel which includes an opaque sheet material coated with retro-reflective light reflecting particles and a dark opaque color on the reverse side thereof, and an image formed over top the retro-reflective particles using colored light permeable translucent inks or films to form an image thereon. The opaque sheet and image have a plurality of perforations spaced thereover such that when the light level on the image side of said panel is slightly less than, equal to, or greater than that on the other side, an observer on the image side clearly sees the image while an observer on the other side sees through the panel without seeing any trace whatsoever of the image or design." This patent describes the construction of a one-way see-through perforated panel containing a colored image. The panel, however, is not illuminated through light extracted from a light guide.

U.S. Pat. No. 5,722,762 issued to Soll on Mar. 3, 1998 and titled "Illumination device for mounting on the head of a user" discloses, in the Abstract: "An illumination device for mounting on the head of a user including a frame having a cross member and a pair of rearwardly extending temple members attached to opposite ends of the cross member. At least one focusable light assembly is rotatably mounted to the frame and includes a light source for emitting light. The light assembly is adjustable by the user for varying the vergence and direction of the light emitted from the light source." This patent describes an illumination device incorporated into a specialized eyeglass-type frame. This is a standalone device and is not mounted onto eyeglasses or function as eyeglasses.

U.S. Pat. No. 5,741,060 issued to Johnson on Apr. 21, 1998 and titled "Baseball cap light" discloses, in the Abstract: "A combination baseball style cap and light assembly, wherein the cap has a crown, a bill extending from the crown, a sweatband liner circumscribing the bottom edge of the cap, and a reinforcing crown liner, has a double light and switch assembly comprising two lamp sockets affixed to a mounting plate on each side of a sealed sub-mini micro switch also affixed to the mounting plate. The plate is in turn affixed to the underside of the bill of the cap, two lamp sockets affixed to the mounting plate such that their axes decline at an acute angle to the plane of the plate and converge at an acute angle to a line perpendicular to the front edge of the plate, setting the focal point of the lamps at a predetermined location directly out from and generally equidistant between the wearers eyes. A micro switch is affixed to an integral mounting flange on the mounting plate located approximately on the center line of the mounting plate between the two sockets. First and second battery holders are each affixed respectively to each side of the center line of the top edge of the reinforcing element of the crown of the cap and the top edge of the crown of the cap, and a circuit electrically couples the micro switch, the lamp sockets and the battery holders." This patent describes lamps mounted to the visor of a baseball cap. The lamps, however, do not involve eyeglasses that emit any light.

U.S. Pat. No. 5,830,529 issued to Ross on Nov. 3, 1998 and titled "Perimeter coating alignment" discloses, in the Abstract: "A method of forming a scratch resistant color ink pattern of multi-color coatings (5) onto a see-through panel (6) with exact registration between successive color coatings of the pattern. The method of the invention includes the steps of: providing a base material (1) having an ink printable release coating on one side thereof; applying a first color coating of ceramic ink (75) to the printable release coating side of the base material (1); applying at least one additional color coating of ceramic ink (76) over at least a portion of the first color coating of ceramic ink (75); perforating the base material to provide a pattern of light passages (28) therethrough, the light passages (28) defining aligned edges of successive color coatings of ceramic inks to ensure exact registration between said successive color coatings of ceramic inks; transferring the pattern of color coatings of ceramic inks (5) onto a surface of a see-through panel (6); and heating the see-through panel (6) to fuse said pattern of color coatings of ceramic inks (5) onto said surface of said see-through panel (6). In one embodiment, the base material (1) consists of water slide paper and such that the pattern of color coatings is wetted and transferred to the see-through panel by water slide transfer. In another embodiment, the base material consists of heat transfer paper and the pattern of color coatings is transferred by application of heat and pressure or just pressure alone." This patent describes a method of forming a perforated see-through panel with multiple print coatings. The panel, however, is not illuminated through light extracted from a light guide.

U.S. Pat. No. 5,892,600 issued to Kuo on Apr. 26, 1999 and titled "Spectacle lens structure with a planar reflective outer surface" discloses, in the Abstract: "A spectacle lens structure includes a light transmitting base plate having a serrated surface defining a hologram. A thin reflective coating having a planar outer surface is provided on the serrated surface to partially reflect an incident light and allow the remaining portion of the incident light to penetrate and diffract about the serration for the formation of the holographic image. The reflective coating may be of a refractive index quite different from that of the base plate so as to provide a brazed 3-D image. If the reflective coating is made of a material having a refractive index close to the base plate, then a further coating having a high refractive index, such as ZnS, has to be provided on the reflective coating to provide a brazed 3-D image." This patent describes a lens structure in spectacles for the formation of a hologram on a surface of the lens for decorative purposes. The lenses of the spectacles, however, do not emit any light.

U.S. Pat. No. 5,946,071 issued to Feldmasn on Aug. 31, 1999 and titled "Portable reading light" discloses, in the Abstract: "An eyeglass frame includes an elongated flexible electroluminescent light source extending along a perimeter extent of the frame. A self contained voltage source is also carried by the eyeglass frame, together with a manually operable switch. When the switch is placed in the On position a continuous source of electroluminescent light will be emitted along the entire perimeter extent of the frame which includes the electroluminescent light source. A reflective surface may be provided along the rear of the eyeglass frame so that all the rays of the electroluminescent light source are forwardly directed." This patent describes an eyeglass frame containing a flexible electro-luminescent light source. The eyeglass lenses, however, do not emit any light.

U.S. Pat. No. 5,997,165 issued to Lehrer on Dec. 7, 1999 and titled "Portable reading light device" discloses, in the Abstract: "A portable reading light device adapted to be worn about the head of a user or the like. The device utilizes a projection housing adapted to be used as the light source having the terminal end of a fiberoptic mounted therein, the other end extending to a remote lamp unit having a reflector and a light bulb mounted therein." This patent describes a reading light device worn on the head of the user. The lenses of the glasses worn by the user, however, do not emit any light.

U.S. Pat. No. 6,012,827 issued o Caplan et al on Jan. 11, 2000 and titled "Mounting apparatus for head- and body-borne optics and illumination devices" discloses, in the Abstract: "A mount for affixing devices such as lightweight illuminators to spectacles is described. The mount includes a pair of opposable jaws pivotably affixed together about a pivot axis, the jaws being intended for affixation about spectacles (e.g., the nosebridge of spectacles), and a mounting yoke pivotably affixed to the clip. The mounting yoke may then pivotably bear an illuminator to allow the illuminator to move in three degrees of freedom." This patent describes an apparatus for mounting illuminators to spectacles. The lenses of the spectacles, however, do not emit any light.

U.S. Pat. No. 6,168,286 issued to Duffy on Jan. 2, 2001 and titled "Brim mounted novelty light for sports caps" discloses, in the Abstract: "A novelty light for baseball style sports attachable to the brim of the cap and positioned to illuminate the front of the crown or head covering portion of the cap. A sports team insignia is preferably attached or attachable to the crown in the area of illumination. The light is arranged to flicker or flash on and off at a high rate and may be contained in a housing appropriate to the sport associated with the team insignia." This patent describes a novelty light attached to the brim of sports caps to illuminate a sports team insignia, often with a flickering or flashing light. This attachment, however, does not involve glasses that project light.

U.S. Pat. No. 6,196,680 issued to Novak on Mar. 6, 2001 and titled "Chemiluminescent eyeglass frame" discloses, in the Abstract: "A chemiluminescent novelty eyeglass frame has curved portions which will extend proximate the eyes of the user. The curved portions are formed with channels which are adapted to receive compartmented ampules containing a chemiluminescent solution separated from an activator. A frangible barrier is provided in the ampules, and the barrier is ruptured by bending the ampules for insertion into the channels. In this way, the chemiluminescent solution and activator mix to produce chemiluminescent light emanating from the frame upon insertion of the ampules into the channels of the curved portions of the eyeglass frame." This patent describes a chemiluminescent novelty eyeglass frame where the chemicals can be mixed by the wearer in a simple manner. The lenses of the eyeglasses, however, do not emit any light.

U.S. Pat. No. 6,242,076 issued to Andriash on Jun. 5, 2001 and titled "Illuminated imageable vision control panels and methods of fabricating" discloses, in the Abstract: "A vision control panel for application to a transparent surface includes a poly-coated adhesive release liner adhered to the underside of a substrate formed of electroluminescent (EL) or luminescent material, a power supplying bus where an electroluminescent material is used, a primary coating overlying the opposite side of the substrate, a first ink receptor coating overlying the binder coating, a second ink receptor coating overlying the first ink receptor coating, a printed image on the second ink receptor coating and a protectant over-laminate. With the exception of the protectant over-laminate, the underlying layers are perforated to enable an observer on the inside of the transparent surface to see through the panel, i.e., through the perforations, while an observer on the opposite side of the panel sees only the illuminated image printed on the panel. To fabricate the panel, opaque coatings are applied to the inside margins of the perforations to prevent light from leaking EL or luminescent material through the perforations to either panel side. A non-perforated release liner is then applied to the poly-coated liner prior to applying the second ink receptor coating and subsequent to perforating. Next, the second ink receptor coating is applied over the first ink receptor coating and onto the surface portions of the non-perforated liner in registration with the perforations to dry the ink subsequently applied during printing. The non-perforated liner is removed with the ink surface portions thereof and the protectant over-laminate is subsequently applied to a surface." This patent describes the construction of an illuminated one-way see-through perforated panel containing a colored image. The panel, however, is not illuminated through light extracted from a light guide.

U.S. Pat. No. 6,258,429 issued to Nelson on Jul. 10, 2001 and titled "One-way see-thru panel and method of making same" discloses, in the Abstract: "A see-through, one-way panel having a white opaque substrate with a dark pigmented adhesive on the rear side. The pigmented adhesive is covered with a release liner. The substrate, adhesive and liner are perforated and thereafter an imperforate barrier is laminated over the release liner. The front surface may be top coated to accept a dye based ink. The front surface is printed with an image by thermal or piezo ink jet printing technology. The resulting panel may then be adhesively applied to a surface." This patent describes the construction of a one-way, see-through perforated panel printed with an image used as signage. The panel, however, is not illuminated through light extracted from a light guide.

U.S. Pat. No. 6,358,598 issued to Hicks on Mar. 19, 2002 and titled "Decorative translucent window covering" discloses, in the Abstract: "A flexible plastic window covering which combines the qualities of being translucent, colorful, easily installed in any size, self-adhering, removable and reusable, easily cleaned, wear and fade resistant, ultraviolet light absorbing, and decorative while providing privacy or hiding an unwanted view." This paten describes the construction of a repositionable translucent window covering. This window covering, however, is not illuminated through light extracted from a light guide.

U.S. Pat. No. 6,398,640 issued to Wong on May 21, 2002 and titled "Lighted masks for underwater divers" discloses, in the Abstract: "A lighted mask for underwater divers utilizing a monochromatic blue-green LED light source secured to the mask directing light to the front of the face plate of the mask and having a push button control mounted on the mask for actuating the light source." This patent describes a mask worn over the eyes for underwater divers on which is mounted an LED lighting device that projects light outward from the mask. The lens of the mask, however, does not emit any light.

U.S. Patent Application 20030189824 published by Meeder on Oct. 9, 2003 and titled "Portable reading light" discloses, in the Abstract: "A reading light comprises a frame for supporting the reading light adjacent to a user's face and a first light source mounting member a first end of which is coupled to the frame, wherein a second end of the first light source mounting member is moveable with respect to the frame in combination with a first light emitting diode coupled to the second end of the first light source mounting member so that movement of the second end of the first light source mounting member relative to the frame redirects light emitted by the first light emitting diode." This patent describes a light assembly attachable to the frame of a pair of glasses to provide light for reading. The lenses of these eyeglasses, however, do not emit any light.

U.S. Pat. No. 6,640,029 issued to Prejzek on Oct. 28, 2003 and titled "Light optical system, especially for information, advertising illumination or decorative purposes" discloses, in the Abstract: "An illuminated display and illuminator for illuminating a planar light conductor with a light source. The illuminator has an injector comprising a wedge-shaped body made of transparent material having a refractive index higher than air, the optical interface between the injector and the light conductor being optically homogeneous. The input side of the injector is shaped such that light entering the injector through the input side is brought into focus at a point inside the planar light conductor or behind it. The illuminator also has a light guide located in an optical path between the light source and the input side of the injector, such that light is guided by the lightguide from the light source to the injector; and into the planar light conductor through the optically homogeneous optical interface, and is distributed through the planar light conductor by internal reflection within the body of the planar light conductor." This patent describes a wedge-shaped body to inject light into a planar light guide and where light is distributed within the light guide through total internal reflection. This patent does not provide for the construction of see-through one-way light-emitting images that extract light from the planar light guide.

U.S. Pat. No. 6,745,506 issued to Maas et al on Jun. 8, 2004 and titled "Luminaire and light-emitting panel" discloses, in the Abstract: "A luminaire comprises a relatively thin and flat light-emitting panel (1) having a light-emitting window (2) and, opposite said light-emitting window, a rear wall (3) with opposed edge surfaces (4, 14). At least one of the edge surfaces (4) is light transmitting and associated with a plurality of light sources (5, 5', 5", . . . ). Light originating from the light sources (5, 5', 5", . . . ) is spread in the panel (1). The invention is characterized in that a plurality of deformities (7, 7', 7", . . . ; 8, 8', . . . ) is provided in the panel (1) for extracting light from the panel (1) via the light emission window (2). The deformities (7, 7', 7", . . . 8, 8', . . . ) are clustered so as to form at least one light symbol (27; 28). The configuration of the clusters (17; 18) of deformities (7, 7', 7", . . . ; 8, 8', . . . ) corresponds to the shape of the light symbol (27; 28). Preferably, the luminaire has a first and a second light-transmitting edge surface, with respectively, a first and a second plurality of light sources being associated with said surfaces. A first cluster of deformities only couples light from the first light source out of the panel, thereby forming a first light symbol, while a second cluster of deformities only couples light from the second light source out of the panel, thereby forming a second light symbol, independently of the formation of the first light symbol. The luminaire according to the invention provides independent lighting and coloring possibilities of light symbols in a single-panel luminaire." This patent describes the construction of an edge lighting system for signage and advertising display. It does not provide one-way see-through capability.

U.S. Pat. No. 6,752,432 issued to Richardson on Jun. 22, 2004 and titled "Identification card with embedded halftone image security feature perceptible in transmitted light" discloses, in the Abstract: "An information-bearing laminar assembly, suitable for use as an identification card, is disclosed. The assembly is characterized by the provision therein of an embedded halftone image security feature that becomes visible essentially only when the assembly is viewed in transmitted light. The information-bearing laminar assembly comprises an inner information-bearing layer interposed between a first and a second light-transmissive protective outer layer. The inner layer contains both visible information-bearing indicia and an imagewise halftone pattern of laser-ablated microholes. The light-transmissivity of the information-bearing inner layer within said half-tone pattern is imagewise differentiated at each microhole as a function of the microhole's penetration depth. Sandwiched between the protective outer layers, the halftone pattern is imperceptible when the information-bearing laminar assembly is viewed in reflection and perceptible when the information-bearing laminar assembly is viewed in transmission." This patent describes a technique for displaying a half-tone image on an identification card when viewed in transmitted light. Illumination is not created through light extracted from a light guide.

U.S. Patent Application 20040150986 published by Chang on Aug. 5, 2004 and titled "Magnetically attachable light assembly for glasses" discloses, in the Abstract: "A light assembly that can be magnetically attached to a pair of glasses. The assembly has a light source and a housing, which has a first magnetic element. When the light assembly is attached to a pair of glasses, the person wearing the glasses would not block the light emitted from the light assembly; the first magnetic element is magnetically coupled to a second magnetic element; and at least a portion of the housing extends over at least a portion of the glasses to provide support for the light assembly, if necessary." This patent describes a family of light assemblies that attach to glasses to provide light for reading. The lenses of these eyeglasses, however, do not emit any light.

U.S. Pat. No. 6,824,265 issued to Harper on Nov. 30, 2004 and titled "Illuminated safety and work glasses" discloses, in the Abstract: "An illuminated safety/work glasses device (202) utilizing light emitting diodes embedded into a one-piece flexible array (101) mounted to the left and right side of the lens (102). The light emitting diodes are positioned to the left and right, and above and below the wearer's eyes and may be powered through use of rechargeable powered earpieces (103 and 111) or remote battery pack (207)." This patent describes the use of light emitting diode arrays mounted to the left and right side of safety glasses to provide illumination. The lenses of the safety glasses, however, do not emit any light.

U.S. Patent Application 20040250457 published by Strein on Dec. 16, 2004 and titled "Transparent electronic illuminated display" discloses, in the Abstract: "The present invention provides an illuminated electronic display which in one preferred form employs LED's to form characters in a message that is desired to be displayed to an intended viewer. A display of the invention is translucent, and is thus suitable for placement in locations which precluded locating illuminated electronic displays of the prior art in those same locations by virtue of the opaqueness of the displays of the prior art. A display means according to the invention may be placed in the rear window of an automobile, without adversely impacting the drivability of the vehicle owing to the translucency of the display. Other window locations are suitable for employment of a device according to the invention as well." This patent describes an illuminated transparent display comprised of a clear rectangular solid with holes through which light transmitted through thin optical fibers are emitted. Light, however, is not extracted from a light guide.

U.S. Pat. No. 6,857,739 issued to Watson on Feb. 22, 2005 and titled "Illuminated eyewear and a method for illuminating eyewear" discloses, in the Abstract: "Illuminated eyewear and a method for illuminating eyewear are provided. The eyewear may have a bridge which is connected to arms at either side of the bridge. A lens may be connected to the bridge. Positioned between the lens and the bridge may be a light source. Light emitted from the light source may enter the lens and may be projected along an edge of the lens. The light may provide an outline of a shape of the lens, and may also provide a decorative display." This patent describes a method for illuminating the edge of the lens of eyeglasses to provide a decorative display. The lenses of these eyeglasses, however, do not serve as light guides from which light is extracted.

U.S. Pat. No. 6,861,116 issued to Emmert on Mar. 1, 2005 and titled "Laser printable window decal from construction" discloses, in the Abstract: "A window decal form is suitable for laser printing and enables ready installation of a decal to the inside of a vehicle window or the like. The window decal form construction includes a liner sheet having a front side and a back side. An adhesive release coating is disposed on the back side of the liner sheet framing a decal area. The decal area and the adhesive release coating define a label area. The label is affixed to the back side of the liner sheet covering the label area via a permanent adhesive. The decal area on the front side of the liner sheet is die cut such that the decal area is removed when the label is peeled from the back side of the liner sheet. This patent describes the construction of a window decal form suitable for laser printing. This window decal, however, does not provide one-way see-through capability.

U.S. Pat. No. 6,863,416 issued to Waters on Mar. 8, 2005 and titled "Lighting device" discloses, in the Abstract: "Lighted reading glasses are provided to enable clear reading of normal sized text to occur when the reading material is held at usual distances from the reader in dimly lit or dark locations. The lighted glasses have high intensity lights, such as in the form of LEDs that generate narrow light beam cones and which are oriented via light mounts as by inward canting of the light beam cones to meet and overlap so high brightness light is generated in a conical overlap area of light which is maximized in size in the range of normal reading distances. The light mounts include housings that are very compactly sized via the use of small coin cell batteries for powering the LEDs they hold. The housings are tapered from their maximum width sized to be slightly larger than the diameter of the disc-shaped cell batteries to either end thereof along their length, and have a depth sized to accommodate two of the stacked very thin, e.g., one-eighth of an inch each, coin cell batteries. In this manner, a very small and compact light module is provided that, while especially well-suited for reading glasses due to the preferred inward cant provided by light mounting surfaces of the housing to tailor the location of the overlap lighted area to the reading area, can also be used with other types of head gear, such as caps or other types of hats." This patent describes lighting modules attached to the temple arms of eyeglasses to provide directed bright light for reading in dimly lit areas. The lenses of the eyeglasses, however, do not emit any light.

U.S. Pat. No. 6,872,435 issued to Bull et al on Mar. 29, 2005 and titled "Printed film sheet" discloses, in the Abstract: "The present invention relates to graphic or informational articles that may be applied to a surface of a translucent or substantially clear substrate so that the image may be viewed through the substrate. The graphic articles of the present invention include a perforated imageable component and a non-perforated attachment component. The imageable component includes an opaque, perforated imageable film layer that accepts an image layer on its first major surface. On the second major surface of the imageable film layer, a perforated, opaque light absorbing film is applied." This patent describes the construction of a perforated printed film on which the printed image can be recognized when viewed on one side and is transparent when viewed from the opposite side. The film, however, is not illuminated through light extracted from a light guide.

U.S. Patent Application 20050123707 published by Veck et al on Jun. 9, 2005 and titled "Method for printing unidirectional and see-through graphics" discloses, in the Abstract: "A convenient, time-efficient, easy-to-use method for creating a substrate covering comprising graphic images, such that the substrate covering can be substantially opaque to an observer looking from one side of the substrate (allowing him to see an image), yet the observer is able to see through the substrate covering from the other side of the substrate, or such that an observer would be able to see the images as well as objects beyond the substrate, comprising the steps of (1) creating an outline for the substrate covering; (2) creating at least one artwork; (3) launching a window wizard, which allows a user to select the position of the covering with respect to the substrate; at least one artwork; and at least one primer in accordance with the desired visual effects; (4) selecting the position of the covering with respect to the substrate; at least one artwork; and at least one primer in accordance with the desired visual effects; and (5) sending the window wizard output for printing onto a substantially clear laminate that could be applied to the substrate, wherein stacked layers of the selected artwork and selected primers are printed with perforations onto said laminate, wherein the perforations of the stacked layers are aligned." This patent describes the construction of unidirectional and see-through laminate, such as window coverings, that can be printed with perforations. The laminate, however, are not illuminated through light extracted from a light guide.

U.S. Patent Application 2005/0146866 published by Waters on Jul. 7, 2005 and titled "Lighting device" discloses, in the Abstract: "Lighted reading glasses are provided to enable clear reading of normal sized text to occur when the reading material is held at usual distances from the reader in dimly lit or dark locations. The lighted glasses have high intensity lights, such as in the form of LEDs that generate narrow light beam cones and which are oriented via light mounts as by inward canting of the light beam cones to meet and overlap so high brightness light is generated in a conical overlap area of light which is maximized in size in the range of normal reading distances. The light mounts include housings that are very compactly sized via the use of small coin cell batteries for powering the LEDs they hold. The housings are tapered from their maximum width sized to be slightly larger than the diameter of the disc-shaped cell batteries to either end thereof along their length, and have a depth sized to accommodate two of the stacked very thin, e.g., one-eighth of an inch each, coin cell batteries. In this manner, a very small and compact light module is provided that, while especially well-suited for reading glasses due to the preferred inward cant provided by light mounting surfaces of the housing to tailor the location of the overlap lighted area to the reading area, can also be used with other types of head gear, such as caps or other types of hats." This patent describes lighting modules attached to the temple arms of eyeglasses to provide directed bright light for reading in dimly lit areas. The lenses of the eyeglasses, however, do not emit any light.

British Patent 2411009 issued to Paton on Aug. 17, 2005 and titled "Eyewear with one or more light emitting diodes" discloses, in the Abstract: "Illuminated spectacles 10 comprising a frame (12) for retaining one or more lenses (22 and 24) and at least one light source 54, 56, 58 associated the frame (12), the light source being arranged to illuminate an area in front of the lens or lenses (22 and 24) and comprising one or more light emitting diodes 60 powered by one or more batteries and a switch (38) for selectively connecting and disconnecting the one or more light emitting diodes (60) from the one or more batteries. A jack or inductive coil 62 is preferably included for recharging the battery. Preferably contacts (50, 52 FIG. 2) within the arms 18, 20 conduct current to LEDs such that opening the arms 18, 20 automatically turns on the LEDs. A circuit is preferably provided for adjusting light intensity and monitoring battery charge." This patent describes a spectacle frame with LEDs to illuminate the area in front of the spectacle. The lenses of these spectacles, however, do not emit any light.

BRIEF SUMMARY OF THE INVENTION

This invention enables the construction of see-through light guides that emit light in one direction only. This means that a viewer looking at the illuminated side of the light guide will see a light pattern being emitted, while a viewer on the opposite side of the light guide will see no illumination. Specific applications include eyeglasses that project light for reading in dimly lit environments and eyeglasses that serve as a hands-free flashlight. The invention also enables the creation of a variety of novelty glasses. Such novelty glasses can emit different colored lights as well as colored, lighted images. The invention also enables the creation of one-way see-through windows that emit lighted text and images for signage and advertising.

The invention combines the principals of Total Internal Reflection used in light guides and Halftone Reflection used in one-way see-through mirrors to create one-way light emission. In the eyeglass and window embodiments of the invention, light from LEDs are injected into these items to make them into light guides. Special printing and imprinting processes are then used to create one-way see-through images that can emit light from the eyeglasses or window. The lighted image is emitted outward only so that a person can see outward through the eyeglasses or window without seeing the lighted image. This phenomenon occurs in a manner similar to one-way mirrors because only one side of the printed image reflects light and the image covers only a portion of the total surface area of the light guide, e.g. 50%. This enables see-through viewing.

A major advantage of the invention is its low cost of manufacturing. Plastic injection molding allows high quality and low cost manufacturing of plastic components. The light-extracting, one-way see-through film can be printed or imprinted inexpensively while continual improvements in LED technology have resulted in brighter LEDs at lower cost.

FEATURES AND ADVANTAGES

A feature of the invention is that it enables eyeglass lenses to project light onto any reading material directly in front of the lenses with no light being directed backward into the eyes of the wearer. This provides hands-free illumination for night reading.

Another feature of the invention is that it can serve as a hands-free flash light using bright LEDs. Since the light is emitted outward from the lenses, the wearer can easily aim the light by looking at the object to be illuminated. The emitted light is directed entirely outward and not into the wearer's eyes.

Another feature of the invention is that it enables the creation of a variety of novelty glasses and eyewear. Such novelty glasses can emit different colored lights as well as colored, lighted images.

Another feature of the invention is that it provides the construction of one-way see-through windows that emit illuminated colored images. Such windows can be used for signage and advertising.

Another feature of the invention is that it provides for the construction of a one-way see-through lighted window on a door. A person standing behind a door can look through such a window at the illuminated person outside the door.

Another feature of the invention is its low cost of manufacturing. Plastic injection molding allows high quality and low cost manufacturing of plastic components. The light-extracting, one-way see-through film can be printed or imprinted inexpensively while continual improvements in LED technology have resulted in brighter LEDs at lower cost.

BRIEF DESCRIPTION OF THE DRAWINGS

FIG. 2A is a cross-section view of the light-reflecting image and the light-blocking layer printed or imprinted on one side of a clear film before being adhered to the light guide.

FIG. 2B is a cross-section view of the light-reflecting image and the light-blocking layer printed or imprinted on opposite sides of a clear film before being adhered to the light guide.

DETAILED DESCRIPTION OF THE INVENTION, INCLUDING THE PREFERRED EMBODIMENT

Terminology

The terminology and definitions of the prior art are not necessarily consistent with the terminology and definitions of the present invention. Where there is a conflict, the following definitions apply.

"Printing" includes but is not limited to flexographic printing; screen printing; digital printing; laser printing, offset lithography printing; thermal transfer; and hot and cold stamping.

"Imprinting" includes but is not limited to etching through chemical, laser, and other means; injection molding or cast film molding; and surface lamination.

"See-through pattern" is any graphic pattern, including but not limited to halftone patterns, whereby a viewer at a certain distance from the pattern can see through the pattern with minor or imperceptible degradation in vision clarity.

"Image" is any single-color or multi-color graphic image of any size that can be printed or imprinted in a see-through pattern, including but not limited to pictures, drawings, photographs, holograms, or any graphic pattern.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Figure 1:
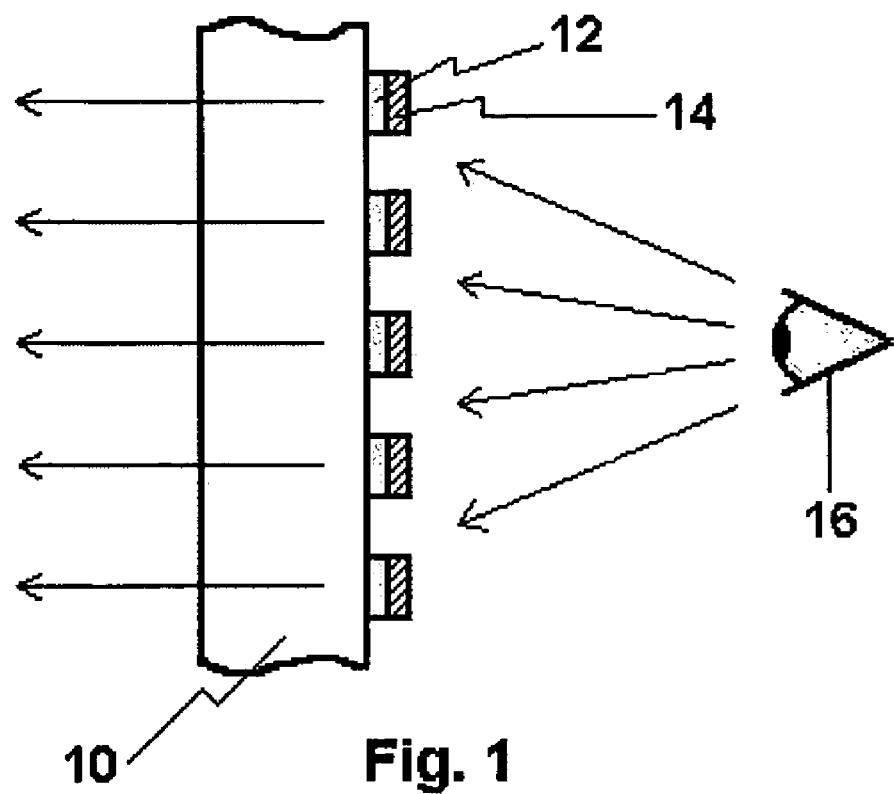
FIG. 1 is a cross-section view of the basic construction of the see-through, one-way light-emitting light guide. It shows the relative position of the light guide, the light-reflecting image, and the light-blocking layer.

Referring to the drawings, FIG. 1 shows the basic construction of the present invention comprised of a light guide 10, a light-reflecting see-through image 12, and a light-blocking see-through layer 14.

There are many ways to construct the light guide 10 of the present invention. The light guide 10 is composed of optical plastic or glass, and is Illuminated through edge-illumination or other means using LEDs or other light sources. The air surrounding the light guide 10 serves to maintain total internal reflection within the light guide and make the light within the light guide substantially non-visible. The LEDs are powered by a battery pack or other power source.

The light-reflecting see-through image 12 is positioned on the surface of the light guide 10, and is composed of any material that reflects or refracts light. The light-blocking see-through layer 14 is positioned on the back surface of the light-reflecting see-through image, i.e. the surface not in contact with the light guide 10. When the LEDs are turned on, light will be transmitted edgewise into the light guide 10. Light will then be emitted from the light-reflecting image 12 by reflection and/or refraction. The light will be emitted in one direction only as it is blocked in the opposite direction by the light-blocking layer 14. A person 16 looking at the back of the light guide 10 will see through the light guide 10 with minor or imperceptible degradation in vision clarity without seeing the light-reflecting image 12.

There are numerous ways to construct the light-reflecting image and the light-blocking layer. In FIG. 2A, a light-blocking see-through layer 22 is printed or imprinted on an optically clear film 26 using a light-blocking material such as black ink, reflective ink, or reflective foil. A light-reflecting see-through image 24, composed of one or more light-reflecting or light-refracting material, such as Titanium Dioxide (TiO2) or holographically recorded surface relief structures, is printed directly above the light-blocking layer 22. Optionally, the light reflecting see-through image 24 contains a permanent or repositionable adhesive. To maintain the see-through property of the light guide 20, a printing machine capable of precise registration is required to print the light-reflecting image 24 directly above the light-blocking layer 22. The area of the light-reflecting image 24 should be entirely within the area covered by the light-blocking layer 22. Optionally, to produce a specific color, one or more colorants, such as CMYK pigments or dyes, are printed directly above the light-reflecting image 24 or between the light-reflecting image 24 and the light-blocking layer 22. The film side containing the light-reflecting image 22 is then adhered to the surface of the light guide 20.

An alternative construction is shown In FIG. 2B. Here, a light-blocking layer 23 is printed or imprinted on an optically clear film 27. A light-reflecting image 25 is printed or imprinted directly over the light-blocking layer 23 on the opposite side of the film 27. Optionally, the light reflecting see-through image 25 contains a permanent or repositionable adhesive. Optionally, to produce a specific color, one or more colorants, such as CMYK pigments or dyes, are printed directly above or below the light-reflecting image 25. The film side containing the light-reflecting image 23 is then adhered to the surface of the light guide 21.

Figure 3:
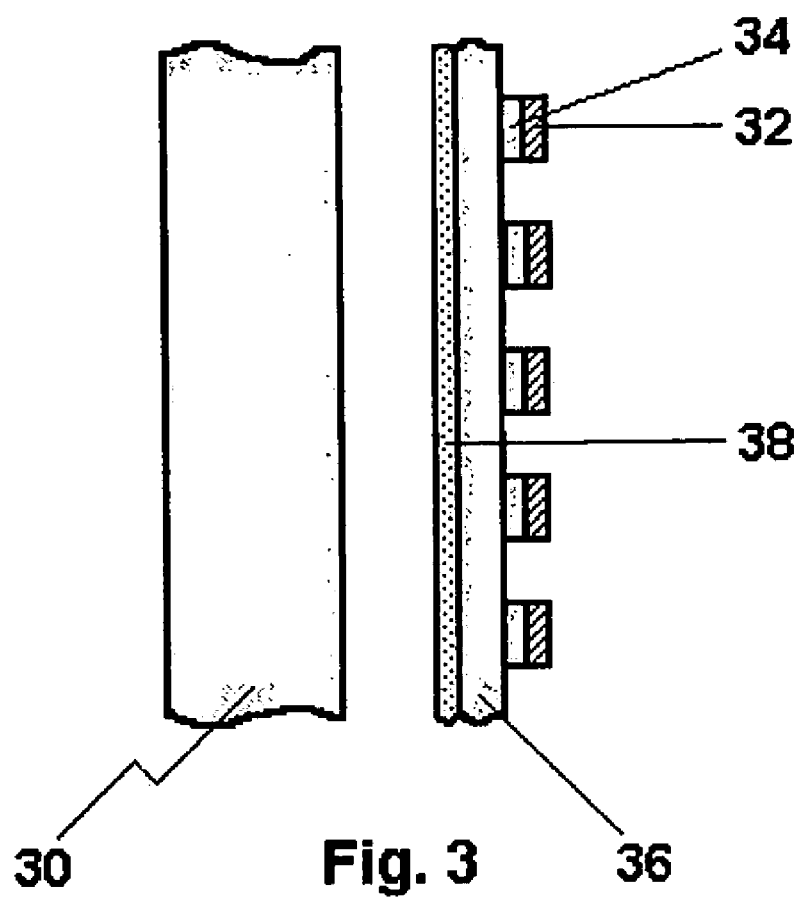
FIG. 3 is a cross-section view of the light-reflecting image and the light-blocking layer printed or imprinted on one side of a clear film before adhering the opposite side of the film to the light guide using an optically clear adhesive.

Another construction is shown in FIG. 3. Here, a light-reflecting see-through image 34 is printed or imprinted on an optically clear film 36. A light-blocking see-through layer 32 is printed or imprinted directly above the light-reflecting image 34. Optionally, to produce a specific color, one or more colorants, such as CMYK pigments or dyes, are printed between the film 36 and the light-reflecting image 34 or between the light-reflecting image 34 and the light-blocking layer 32. The side of the film 36 opposite the side containing the light-reflecting image 34 is adhered to the surface of the light guide 30 with a permanent or repositionable optically clear adhesive 38 that preferably has an index of refraction that matches the index of refraction of the light guide 30.

The constructions in FIGS. 2A, 2B, and 3 will all exhibit the following properties: First, when the light-reflecting image 24, 25 or 34 consists entirely of a see-through pattern and a repositionable adhesive is used, then applying pressure to the film 26, 27, or 36 using a stylus or any other means of pressure application will cause the area of the film beneath the pressurized area to bond to the light guide 20, 21, or 30. This causes light to be emitted from the light guide 20, 21, or 30 and creates an illuminated image such as a drawing. Peeling off the film 26, 27, or 36 from the light guide 20, 21, or 30 will erase the illuminated image. Second, when the light-reflecting image 24, 25 or 34 consists entirely of a see-through pattern and a permanent adhesive is used, turning on the LEDs will result in a uniform stream of light being emitted outward from the light guide 20, 21, or 30.

Figure 4:
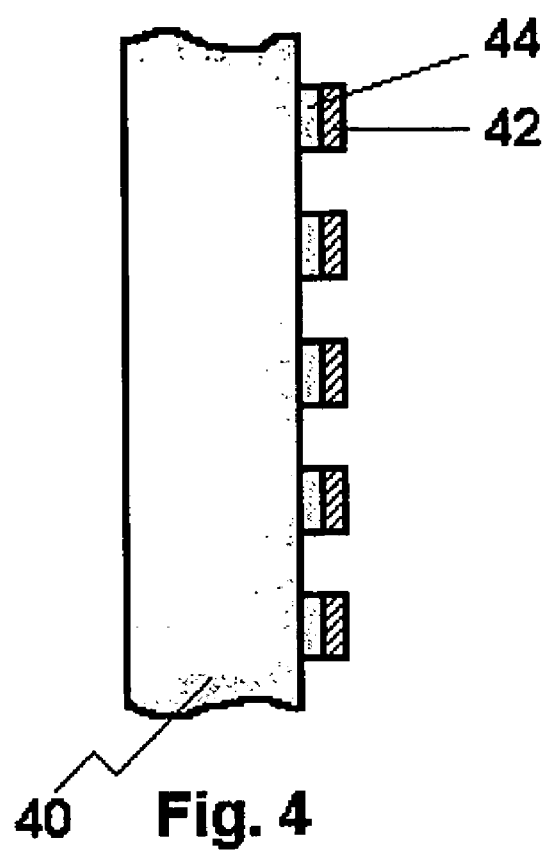
FIG. 4 is a cross-section view of the light guide on which is printed or imprinted the light-reflecting image and the light-blocking layer.

Another construction is shown in FIG. 4. Here, a light-reflecting image 44 is printed or imprinted directly onto the light guide 40. A light-blocking layer 42 is printed or imprinted directly above the light-reflecting image 42. Optionally, to produce a specific color, one or more colorants, such as CMYK pigments or dyes, are printed between the light-reflecting image 44 and the light-blocking layer 42. When the light-reflecting image 44 consists entirely of a see-through pattern, turning on the LEDs will result in a uniform stream of light being emitted outward from the light guide 40.

Figure 5:
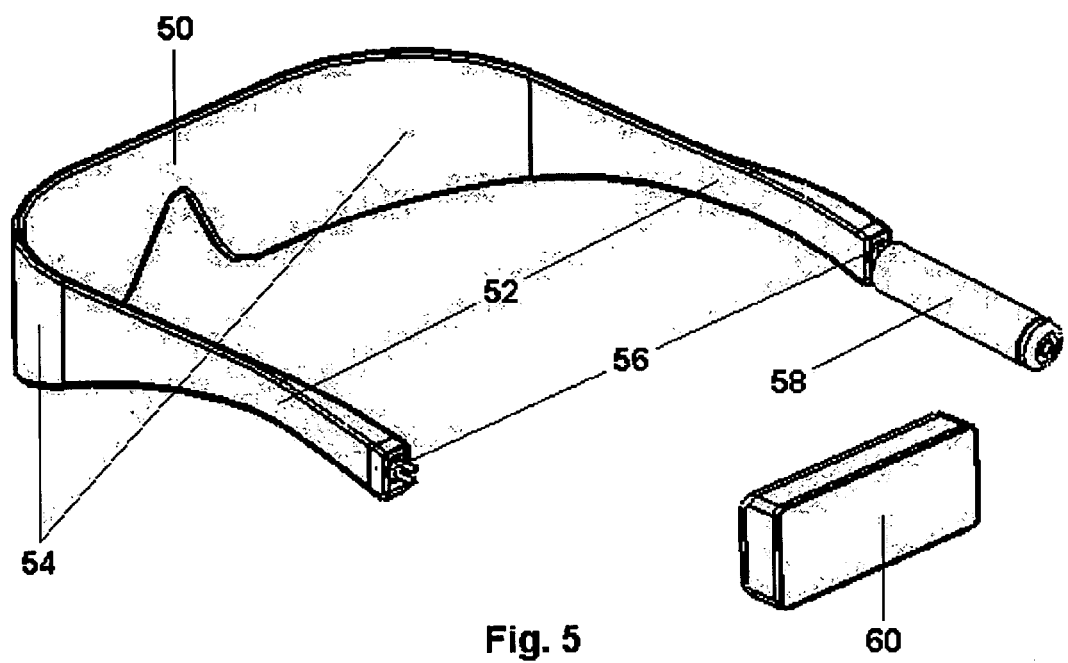
FIG. 5 is a perspective view of a pair of light-emitting eyeglasses comprised of a single lens integrated with the temple arms.

FIG. 5 shows an application of the present invention to a pair of eyeglasses. Here the pair of eyeglasses is the light guide and is comprised of a single lens 50 that is curved and integrated with the temple arms 52. A light-reflecting image and a light-blocking layer are applied on the inside of the lens 50 using the construction shown in FIG. 2A, 2B, 3, or 4. The back end of each temple arm 52 holds an LED 56 that injects light directly into the temple arm 52. The light is transmitted forward through the temple arms, around the curved portion 54 of the lens, and into the front portion 50 of the lens. The gradual curvature 54 of the lens 50 helps to maintain total internal reflection of the LED light transmitted from the temple arms 52 to the lens 50.

To change the color of the LED light to a different color, the temple arm 52 may have a color filter, or be coated with a coat of color dye. To better channel the LED light within the temple arm and help maintain total internal reflection, the temple arm 52 may have a coat of vacuum reflective deposit, such as aluminium, or have an opaque covering 58 on the back portion of the temple arm 52. The battery pack 60 powers the LEDs 56.

As shown in FIG. 5, the present invention enables the creation of a variety of novelty glasses and eyewear. Such novelty glasses can emit different colored lights as well as colored, lighted images. When the light-reflecting image consists entirely of a see-through pattern and a permanent adhesive is used, turning on the LEDs 56 will result in a uniform stream of light being emitted outward from the lens 50. This enables the construction of eyeglasses to be used for night reading or as a hands-free flashlight when bright LEDs are used.

OTHER EMBODIMENTS

Another embodiment of the present invention is to construct a pair of eyeglasses comprised of a single lens or dual lenses that are secured to separate temple arms. The left and right outer edge of the lens, or the top or bottom edge of the lens, is adapted to hold an LED and to provide edge illumination to the lens. A light-reflecting image and a light-blocking layer are applied on the inside of the lens using the construction shown in FIG. 2A, 2B, 3, or 4. A battery pack is used to power the LEDs. Except for the difference in construction, this eyeglass embodiment will have the same characteristics as the eyeglasses in FIG. 5.

Figure 6:
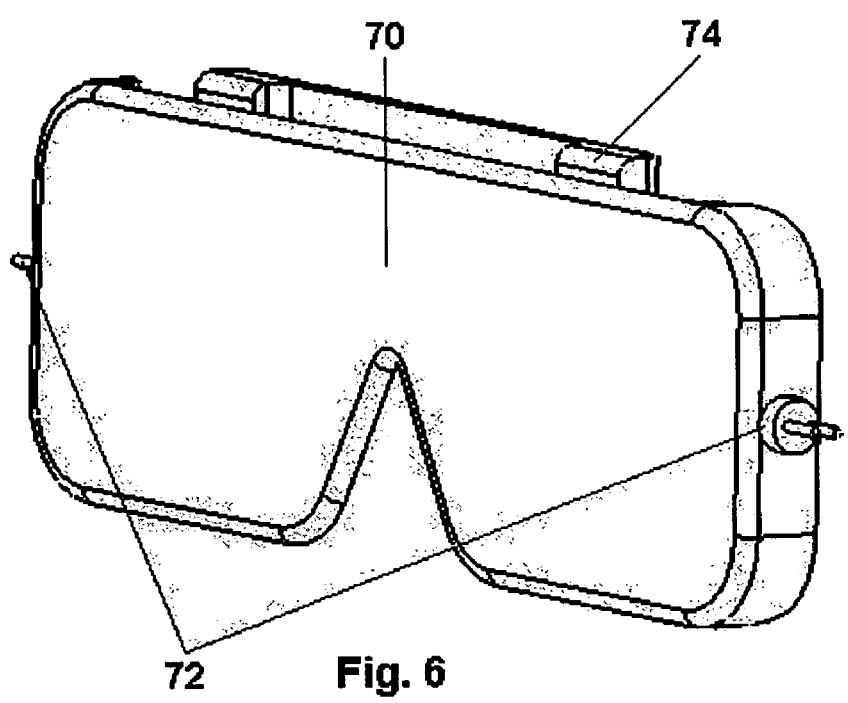
FIG. 6 is a perspective view of a light-emitting lens assembly attachable to a pair of eyeglasses.

Another embodiment is to construct a lens assembly comprised of a single lens or dual lenses 70 that are attachable to a pair of eyeglasses, as shown in FIG. 6. The left and right edge of the lens is adapted to hold an LED 72 that provides edge illumination to the lens. A light-reflecting image and a light-blocking layer are applied on the inside of the lens using the construction shown in FIG. 2A, 2B, 3, or 4. A battery pack is used to power the LEDs. Clips or a flip-down mechanism 74 is used to mount the lens assembly to the top of the eyeglass frame such that the lens assembly can flip down over the eyeglass lenses. Except for the difference in construction, this lens assembly when attached to a pair of eyeglasses will have the same characteristics as the eyeglasses in FIG. 5.

Another embodiment is to construct a window adapted to accept edge illumination from LEDs or other light sources. A light-reflecting image and a light-blocking layer are applied on the inside of the window using the construction shown in FIG. 2A, 2B, 3, or 4. Except for the difference in construction, this window will have the same characteristics as the eyeglasses in FIG. 5. A one-way see-through window that emits illuminated colored images can be used for signage and advertising. By incorporating such a window in a door, a person standing behind the door can look through the window at the illuminated person outside the door.

The invention claimed is:

1. A display system mountable to a planar sheet of transparent material having a front surface and a back surface, the transparent material having a critical angle of incidence at the front surface and the back surface sufficient to establish total internal reflection within the transparent material, the display system comprising:

a light source mountable to the transparent material for injecting light into the transparent material at an angle of incidence at the front surface and the back surface that is greater than the critical angle of incidence to promote total internal reflection of the injected light within the transparent material; and a film having a front layer and a back layer, the front layer being mountable to the back surface of the transparent material, wherein the mounted film alters the critical angle of incidence to be greater than the angle of incidence of the injected light so as to extract injected light into the film from the transparent material, the front layer comprising a one-way see-through image pattern illuminable by the extracted light and the back layer comprises a light-blocking see-through pattern.

2. The display system of claim 1 further comprising a transparent adhesive for mounting the film to the transparent material.

3. The display system of claim 1 wherein the one-way see-through image pattern is registered with the light-blocking see-through pattern.

4. The display system of claim 1 wherein the film includes a colorant to provide a color illuminated image pattern.

5. The display system of claim 4 wherein the colorant is disposed between the one-way see-through image pattern and the light-blocking see-through pattern.

6. The display system of claim 1 wherein the light source is disposed to edge illuminate the transparent material.

7. A method of making a display system in communication with a planar sheet of transparent material having a front surface and a back surface, the transparent material having a critical angle of incidence at the front surface and the back surface sufficient to establish total internal reflection within the transparent material, the method comprising:

mounting a light source to the transparent material for injecting light into the transparent material at an angle of incidence at the front surface and the back surface that is greater than the critical angle of incidence to promote total internal reflection of the injected light within the transparent material;

fabricating a film having a front layer and a back layer, the front layer comprising a one-way see-through image pattern and the back layer comprises a light-blocking see-through pattern; and mounting the front layer of the film to the back surface of the transparent material, wherein the mounted film alters the critical angle of incidence to be greater than the angle of incidence of the injected light so as to extract injected light into the film from the transparent material to illuminate the image pattern.

8. The method of claim 7 wherein mounting the film to the transparent material comprises applying a transparent adhesive.

9. The method of claim 7 wherein fabricating the film comprises registering the one-way see-through image pattern with the light-blocking see-through pattern.

10. The method of claim 7 wherein fabricating the film comprises disposing a colorant to provide a color illuminated image pattern.

11. The method of claim 10 wherein the colorant is disposed between the one-way see-through image pattern and the light-blocking see-through pattern.

12. The method of claim 7 wherein the light source is disposed to edge illuminate the transparent material.

13. A display system mountable to a planar sheet of transparent material having a front surface and a back surface, the transparent material having a critical angle of incidence at the front surface and the back surface sufficient to establish total internal reflection within the transparent material, the display system comprising:

a light source mountable to the transparent material for injecting light into the transparent material at an angle of incidence at the front surface and the back surface that is greater than the critical angle of incidence to promote total internal reflection of the injected light within the transparent material; and a film having a front layer and a back layer, the front layer being mountable to the back surface of the transparent material, wherein the mounted film alters the critical angle of incidence to be greater than the angle of incidence of the injected light so as to extract injected light into the film from the transparent material, the front layer comprising a one- way see-through image pattern illuminable by the extracted light and the back layer comprises a light-blocking see-through pattern, wherein the one-way see-through image pattern is registered with the light-blocking see-through pattern.

14. The display system of claim 13 further comprising a transparent adhesive for mounting the film to the transparent material.

15. The display system of claim 13 wherein the film includes a colorant to provide a color illuminated image pattern.

16. The display system of claim 15 wherein the colorant is disposed between the one-way see-through image pattern and the light-blocking see-through pattern.

17. The display system of claim 13 wherein the light source is disposed to edge illuminate the transparent material.

* * * * *